United States Patent [19]
Numata

[11] Patent Number: 5,291,978
[45] Date of Patent: Mar. 8, 1994

[54] ONE WAY CLUTCH HAVING OUTER AND INNER RETAINERS EACH MADE OF PLASTICS

[75] Inventor: Tetsuaki Numata, Kitakatsuragi, Japan

[73] Assignee: Koyo Seiko Co., Ltd., Osaka, Japan

[21] Appl. No.: 971,478

[22] Filed: Nov. 4, 1992

[30] Foreign Application Priority Data

Nov. 5, 1991 [JP] Japan .................. 3-288599

[51] Int. Cl.⁵ .................................... F16D 41/07
[52] U.S. Cl. ..................... 192/45.1; 192/41 A
[58] Field of Search ............. 192/41 A, 45.1; 188/82.8

[56] References Cited

U.S. PATENT DOCUMENTS

| Re. 29,985 | 5/1979 | Brownhill et al. . | |
| 2,832,450 | 4/1958 | Wade | 192/45.1 |
| 2,892,523 | 6/1959 | Zlotek | 192/45.1 |
| 2,927,671 | 3/1960 | Sand | 192/45.1 |
| 3,194,369 | 7/1965 | Witte | 192/41 A X |
| 3,952,849 | 4/1976 | Brownhill et al. . | |
| 4,252,221 | 2/1981 | Lanzerath et al. . | |
| 4,327,822 | 5/1982 | Vögele et al. . | |
| 4,347,921 | 9/1982 | Bordes | 192/41 A |
| 4,875,564 | 10/1989 | Leitz et al. | 192/45.1 |
| 4,997,070 | 3/1991 | Kinoshita | 192/41 A |
| 4,998,605 | 3/1991 | Ferris | 192/41 A |
| 5,016,741 | 5/1991 | Leitz | 192/45.1 |

FOREIGN PATENT DOCUMENTS

| 0291550 | 11/1988 | European Pat. Off. . |
| 2273193 | 12/1975 | France . |
| 2385948 | 10/1978 | France . |
| 2413582 | 7/1979 | France . |
| 63-303232 | 12/1988 | Japan . |
| 864887 | 4/1961 | United Kingdom . |

Primary Examiner—Richard M. Lorence
Attorney, Agent, or Firm—Wenderoth, Lind & Ponack

[57] ABSTRACT

In a one-way clutch, an outer retainer is made of a plastic while an inner retainer is made of a fiber-reinforced plastic. Thus, this one-way clutch is lightweight and can be produced at a low cost. The fiber-reinforced plastic of the inner retainer has a greater strength than the plastic of the outer retainer so that inner portions of sprags that serve as center portions about which the sprags swing can be retained by the inner retainer more securely than can the outer portions of the sprags be retained by the outer retainer.

5 Claims, 5 Drawing Sheets

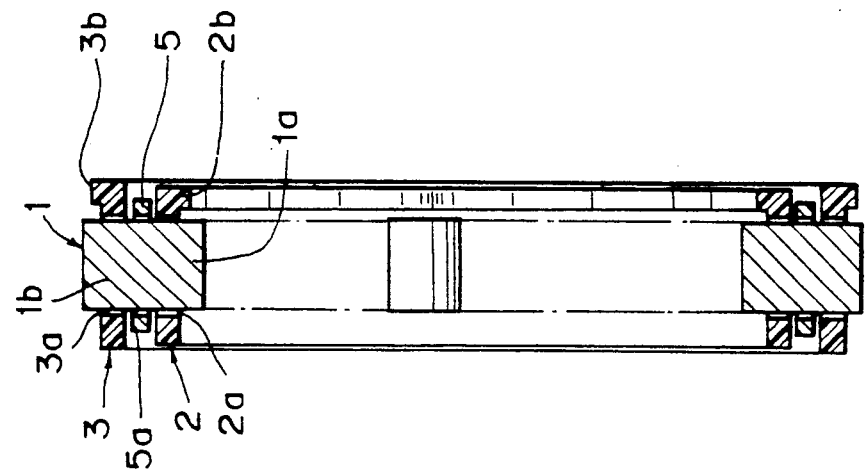
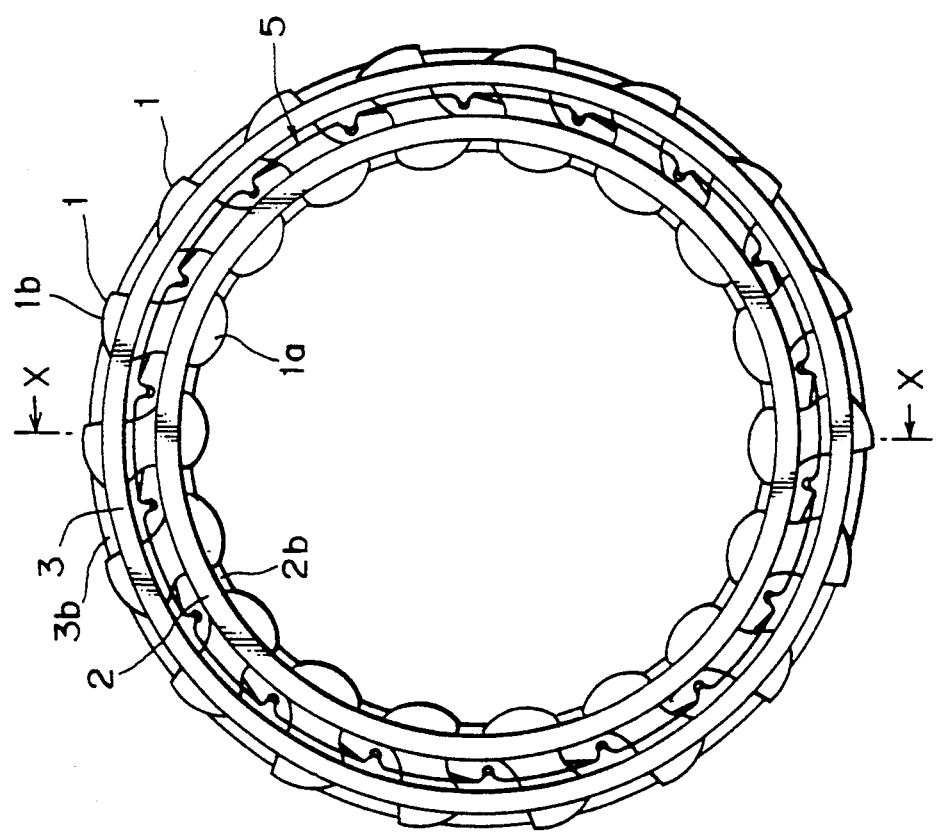

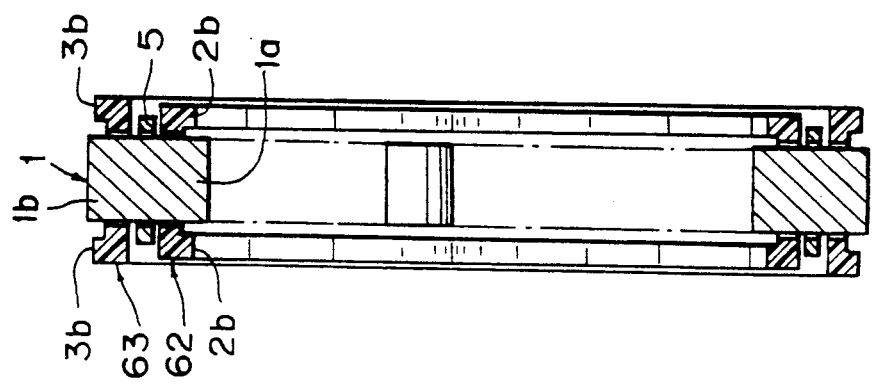
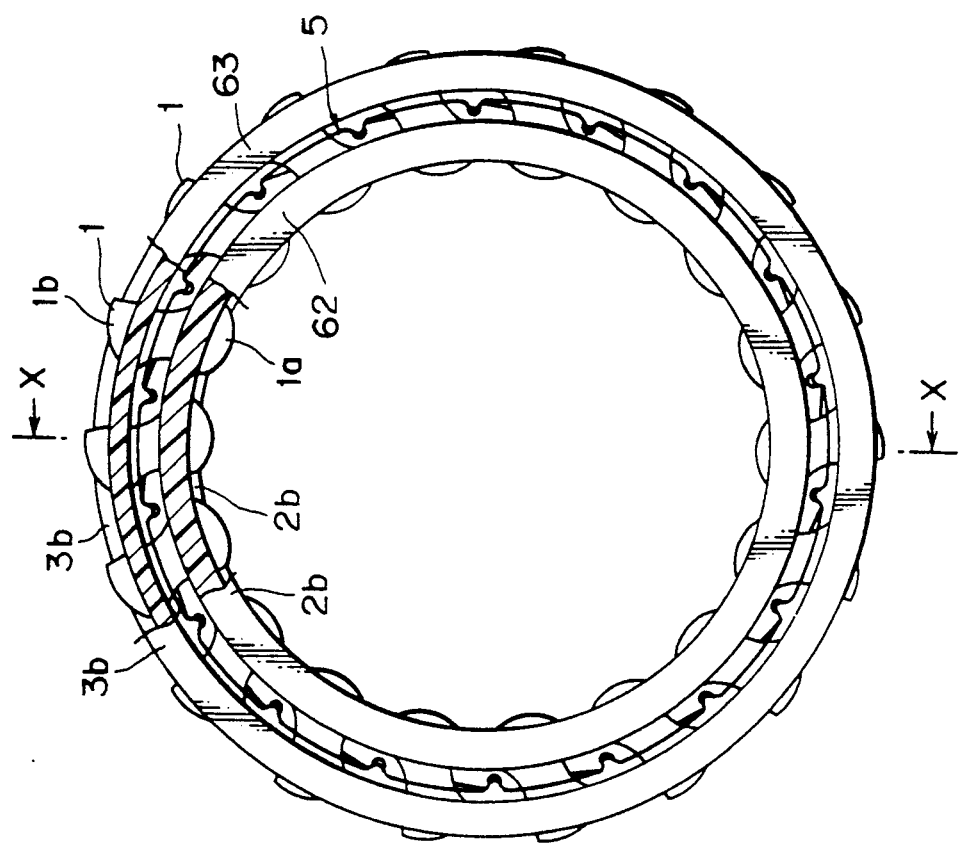

ONE WAY CLUTCH HAVING OUTER AND INNER RETAINERS EACH MADE OF PLASTICS

BACKGROUND OF THE INVENTION

1. Field of the Invention

The present invention relates to one way clutches for use in starters or speed change gears for automobiles, or the like.

2. Description of the Prior Art

FIGS. 8 (a) and 8 (b) are a plan view and a sectional view of a conventional one way clutch, respectively. This one way clutch comprises: a plurality of sprags 51, 51, . . . ; an inner retainer 52, made of a metal, for retaining inner portions 51a of sprags 51; an outer retainer 53, made of a metal, for retaining outer portions 51b of the sprags 51; and an annular ribbon spring 55 for urging the sprags 51 in the clockwise direction in FIG. 8 (a). The outer retainer 53 and the inner retainer 52 have flange portions 53b and 52b, respectively, at one axial end thereof. The one-way clutch is to be interposed between inner and outer rings, which are not shown.

In the above-described one way clutch, when the inner ring rotates clockwise in FIG. 8 (a), the sprags 51 respectively tilt toward an idling side (counterclockwise) about inner portions 51a of the sprags 51 owing to frictional contact between the inner portions 51a of the sprags 51 and the inner ring As a result, the rotating torque of the inner ring will not be transmitted to the outer ring, causing the inner ring to idly rotate.

On the other hand, when the inner ring rotates counterclockwise in FIG. 8 (a), the sprags 51 respectively rotate clockwise about the inner portions 51a thereof owing to frictional contact between the inner portions 51a of the sprags 51 and the inner ring. As a result, the inner and outer rings are locked by the wedging action of the sprags 51, allowing the rotating torque of the inner ring to be transmitted to the outer ring.

However, the conventional one-way clutch has problems of being heavy and expensive since its inner and outer retainers 52 and 53 are both made of a metal.

Recently, in order to provide a lighter one-way clutch at a lower cost, it has been proposed to make the outer retainer plastic, less strength being required for the outer retainer than the inner retainer that retains swinging center portions of the sprags (see Japanese Patent Laid-Open Publication No. 63-303232).

However, the one-way clutch, even with the improvement that the outer retainer is made of a plastic, could not attain sufficient reduction in weight and cost, due to the fact that its inner retainer is still made of a metal.

SUMMARY OF THE INVENTION

The object of the present invention is therefore to provide a lightweight and low cost one-way clutch which does not have an impaired torque transmission ability.

In order to achieve the aforementioned object, there is provided a one-way clutch which comprises: a plurality of sprags arranged between an inner ring and an outer ring so as to be spaced at specified intervals in a circumferential direction of the one-way clutch; an inner retainer for retaining inner portions of the sprags; an outer retainer for retaining outer portions of the sprags; and a spring for urging the sprags in one direction, wherein the outer retainer and the inner retainer are each made of a plastic, the plastic used for making the inner retainer having a greater strength than that used for making the outer retainer.

It is desirable that the inner retainer be made of a fiber reinforced plastic

Preferably, that at least one contact portion is provided on an inner circumferential surface of the inner retainer so that the inner circumferential surface of the inner retainer has a substantially polygonal in section and the contact portion makes contact with the inner ring so as to be frictionally dragged by the inner ring.

Preferably, that a plurality of protrusions are provided on an inner circumferential surface of the inner retainer so that the protrusions make contact with the inner ring so as to be frictionally dragged by the inner ring.

Preferably, that the contact portions are respectively provided at both axial ends of the inner retainer.

Preferably, that the protrusions are respectively provided at both axial ends of the inner retainer.

With the above arrangement, each of the inner and outer retainers is made of a plastic; as a result, sufficient reduction in weight and cost can be realized as compared to when at least one of the inner and outer retainers is made of a metal.

Further, the plastic used for making the inner retainer has a greater strength than that used for making the outer retainer; as a result, the inner portions of the sprags that serve as center portions about which the sprags swing can be retained by the inner retainer more securely than can the outer portions by the outer retainer. The resulting swinging action of the sprags is positive and stable. Consequently, the action of locking and releasing the outer ring with respect to the inner ring can be carried out positively, enabling a sufficient torque transmission ability to be obtained.

When the inner retainer is made of a fiber-reinforced plastic, weight reduction of the inner retainer can be particularly facilitated while its strength is particularly enhanced.

Moreover, when contact portions or protrusions that make contact with the inner ring so as to be frictionally dragged by the inner ring are provided on the inner circumferential surface of the inner retainer, the inner retainer is made to follow the rotation of the inner ring, so that the motion of the inner ring will be positively transmitted to the sprags via the inner retainer.

Thus, when the inner retainer follows the rotation of the inner ring in the direction of torque transmission, the sprags are positively swung, in the upright direction, whereby the inner and outer rings are positively locked so that torque transmission efficiency therebetween can be enhanced. Moreover, when the inner retainer follows the rotation of the inner ring in the idling direction, the sprags are positively swung in the tilting direction, whereby the outer ring is released from the inner ring positively, so that the contact pressure between the sprags and the inner ring is lowered during the idling rotation of the inner ring and the friction between the sprags and the inner ring is reduced.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1(a) is a plan view of a first embodiment of a one-way clutch according to the present invention;

FIG. 1(b) is a sectional view of the one-way clutch taken along line X—X of FIG. 1(a);

FIG. 2(a) is a plan view of a second embodiment of a one-way clutch according to the present invention;

FIG. 2(b) a sectional view of the one-way clutch taken along line X—X of FIG. 2(a);

FIG. 3 (b) is a sectional view of the variation taken along line L—L of FIG. 3 (a);

FIG. 4 (b) is a sectional view of the variation taken along line M—M of FIG. 4 (a);

FIG. 5 (b) is a sectional view of the variation taken along line N—N of FIG. 5 (a);

FIG. 6 (b) is a sectional view of the variation taken along line R—R of FIG. 6 (a);

FIG. 7 (b) is a sectional view of the variation taken along line S—S of FIG. 7 (a);

FIG. 8 (b) is a sectional view of the conventional one way clutch taken along line T—T of FIG. 8 (a).

DETAILED DESCRIPTION OF THE PREFERRED EMBODIMENTS

Figures 3A, 3B:
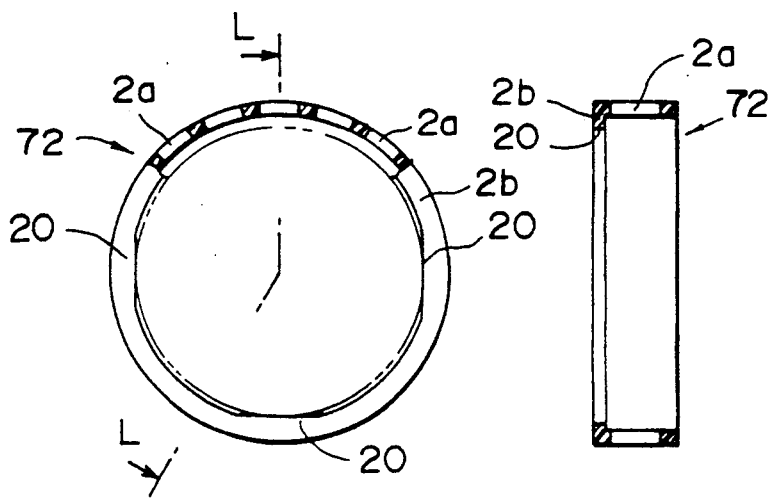
FIG. 3 (a) is a plan view of a variation of the inner retainer of the first embodiment.

Before the description of the present invention proceeds, it is to be noted that the like parts are designated by like reference numerals throughout the accompanying drawings.

FIG. 1 shows a first embodiment of the invention. The one-way clutch of this embodiment comprises a plurality of sprags 1, an inner retainer 2, an outer retainer 3, and an annular ribbon spring 5, and is fitted between inner and outer rings, which are not shown.

The inner retainer 2, the outer retainer 3, and the ribbon spring 5 are respectively provided with windows 2a, windows 3a, and windows 5a. The windows 2a, 3a, 5a are respectively spaced at regular intervals in circumferential directions of the inner retainer 2, outer retainer 3, and ribbon spring 5. The inner retainer 2 retains inner portions 1a of the sprags 1 respectively fitted into the windows 2a of the inner retainer 2 while the outer retainer 3 retains outer portions 1b of the sprags 1 respectively fitted into the windows 3a of the outer retainer 3. The ribbon spring 5 urges the sprags 1 fitted into the windows 5a of the ribbon spring 5 in a direction of engagement with the inner and outer rings (i.e., clockwise in FIG. 1 (a)).

The outer retainer 3 has a flange portion 3b extending from one axial end thereof outwardly in the radial direction thereof. The inner retainer 2 has a flange portion 2b extending from its corresponding axial end inwardly in the radial direction.

The outer retainer 3 is made of a plastic. The inner retainer 2 is made of a fiber-reinforced plastic having a greater strength than that of the plastic used for making the outer retainer 3.

In the one-way clutch having the above-described structure, when the inner ring rotates clockwise in FIG. 1 (a), the sprags 1 tilt toward an idling side (counterclockwise) about the inner portion 1a thereof owing to frictional contact between the inner portion 1a of the sprag 1 and the inner ring. As a result, the rotating torque of the inner ring will not be transmitted to the outer ring, causing the inner ring to idly rotate.

On the other hand, when the inner ring rotates counterclockwise in FIG. 1 (a), the sprags 1 rotate clockwise about the inner portions 1a thereof, so that the inner and outer rings are locked by wedging action of the sprags 1, allowing the rotating torque of the inner ring to be transmitted to the outer ring.

In this embodiment, since each of the outer retainer 3 and the inner retainer 2 is made of a plastic, a sufficient reduction in weight and cost can be attained as compared to the prior art in which at least one of the inner and outer retainers is made of a metal.

Also, since the plastic used for making the inner retainer 2 has a greater strength than that used for making the outer retainer 3, the inner portions 1a of the sprags 1 can be retained by the inner retainer 2 more securely than can the outer portions 1b of the sprags 1 by the outer retainer 3.

In other words, the inner portion 1a that serves as a center portion about which the sprag 1 swings is retained more securely than the outer portion 1b, with the result that the swinging action of the sprag 1 can be positive and stable, allowing the outer ring to be positively locked and released with respect to the inner ring as well as allowing a sufficient torque transmission ability to be obtained.

Furthermore, since the inner retainer 2 is made of a fiber-reinforced plastic, the inner retainer 2 can be lightweight while the the inner retainer 2 can be remarkably strong.

Moreover, since each of the outer retainer 3 and the inner retainer 2 is made of a plastic, the flange portion 3b and the flange portion 2b thereof can be integrally formed without difficulties. The strengths of the outer retainer 3 and the inner retainer 2 are enhanced by virtue of the flange portions 3b and 2b.

Next, a second embodiment of the invention is illustrated in FIGS. 2 (a) and 2 (b). This embodiment differs from the first embodiment only in that flange portions 3b and flange portions 2b are provided at both axial ends of each of an outer retainer 63 and an inner retainer 62, respectively. The strength of the outer retainer 63 and the inner retainer 62 is better than that of the retainers of the first embodiment.

Figures 4A, 4B:
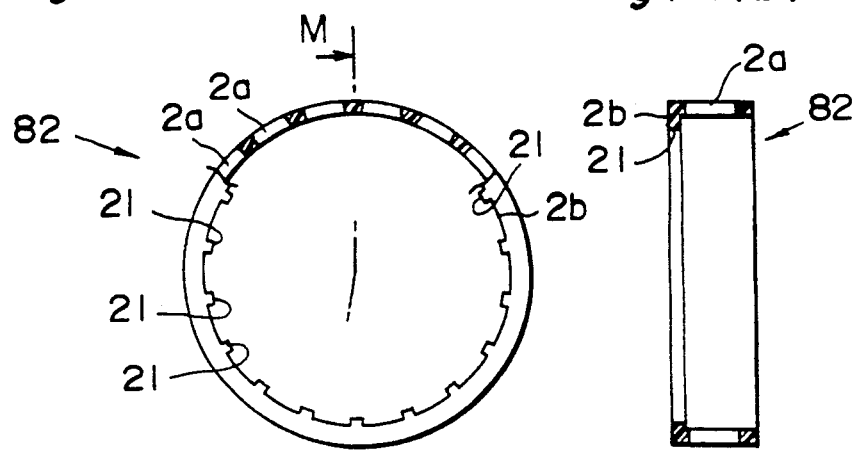
FIG. 4 (a) is a plan view of another variation of the inner retainer of the first embodiment.
Figures 5A, 5B:
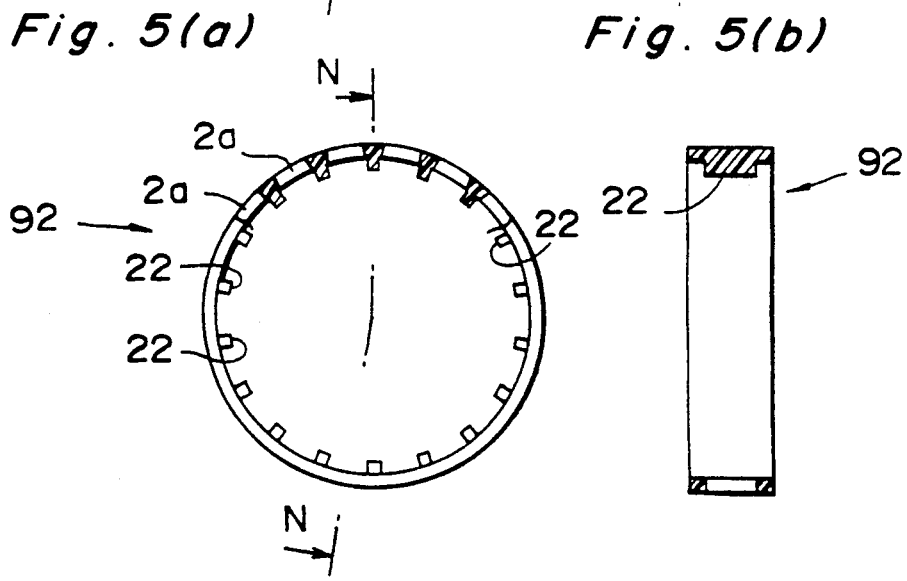
FIG. 5 (a) is a plan view of a variation of the inner retainer of the first embodiment.

Although in the first and second embodiments the inner circumferential surfaces of the flange portions 2b of the inner retainers 2, 62 have a circular form, these surfaces may instead have the form shown in FIGS. 3 (a) and 3 (b). That is, an inner retainer 72 has a plurality of contact portions 20 constituting an inner circumferential surface of the flange portion 2b thereof, so that the inner circumferential surface has a substantially polygonal form, and an inner face of each of the contact portions 20 makes contact with the inner ring. Alternatively, only one contact portion may be provided at the inner circumferential surface of the flange portion 2b, although it is not shown in figures. Further, as shown in FIGS. 4 (a) and (b), the inner circumferential surface of the flange portion 2b of an inner retainer 82 can be defined by a plurality of protrusions 21 that make frictional contact with the inner ring. Further, as shown in FIGS. 5 (a) and (b), the axial center of an inner circumferential surface of an inner retainer 92 can be defined by a plurality of protrusions 22 that make frictional contact with the inner ring. As shown in FIGS. 3 (a), 3 (b), 4 (a), 4 (b), and 5 (a) and 5 (b), when the contact portions 20 or the protrusions 21 and 22 make frictional contact with the inner ring, the inner retainer is made to follow the rotation of the inner ring so that the motion of the inner ring will be transmitted positively to the sprags 1 via the inner retainer. Thus, it is ensured that the sprags 1 will swing in an upright direction by the rotation of the inner ring in a torque transmission direction, allowing the inner ring and the outer ring to be locked positively by the wedging action of the sprags 1, with an increased efficiency of torque transmission from the inner ring to the outer ring. On the other hand, rotation of the inner ring in an idling direction causes the sprags 1 to positively swing in a tilting direction so that the outer ring will be positively released from the inner ring, lowering contact pressure between the sprags 1 and the inner ring in the direction of idling rotation of the inner ring. Consequently, abrasion of the sprags 1 and the inner ring can be reduced during such idling rotation.

Figure 6A:
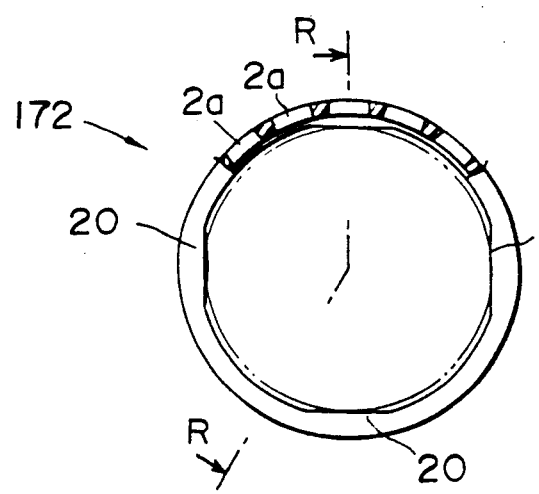
FIG. 6 (a) is a plan view of a variation of the inner retainer of the second embodiment.
Figure 6B:
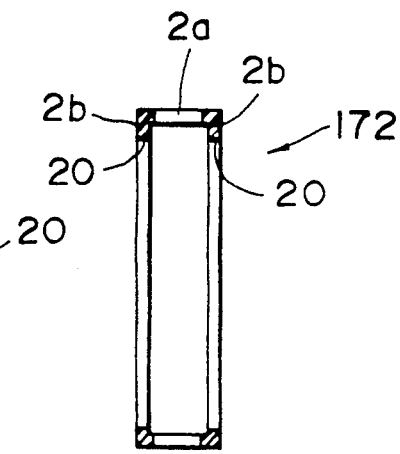
Figure 7A:
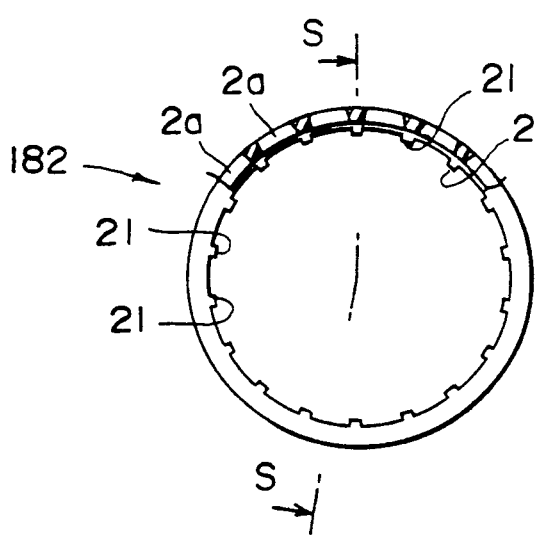
FIG. 7 (a) is a plan view of another variation of the inner retainer of the second embodiment.
Figure 7B:
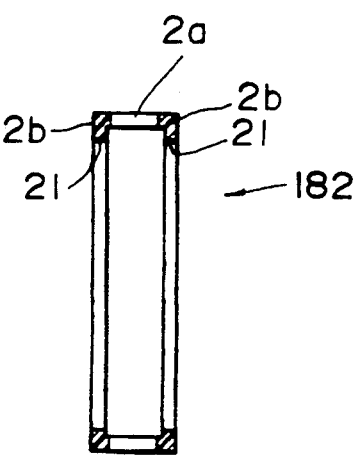
Figure 8B:
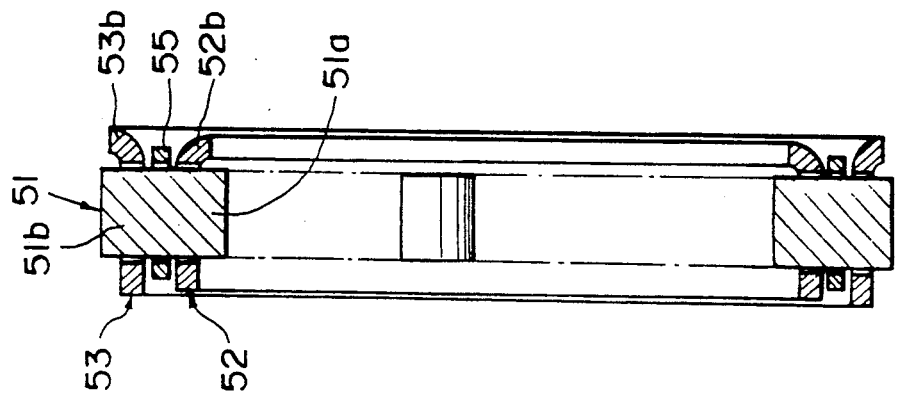
FIG. 8 (a) is a plan view of a conventional one-way clutch.
Figure 8A:
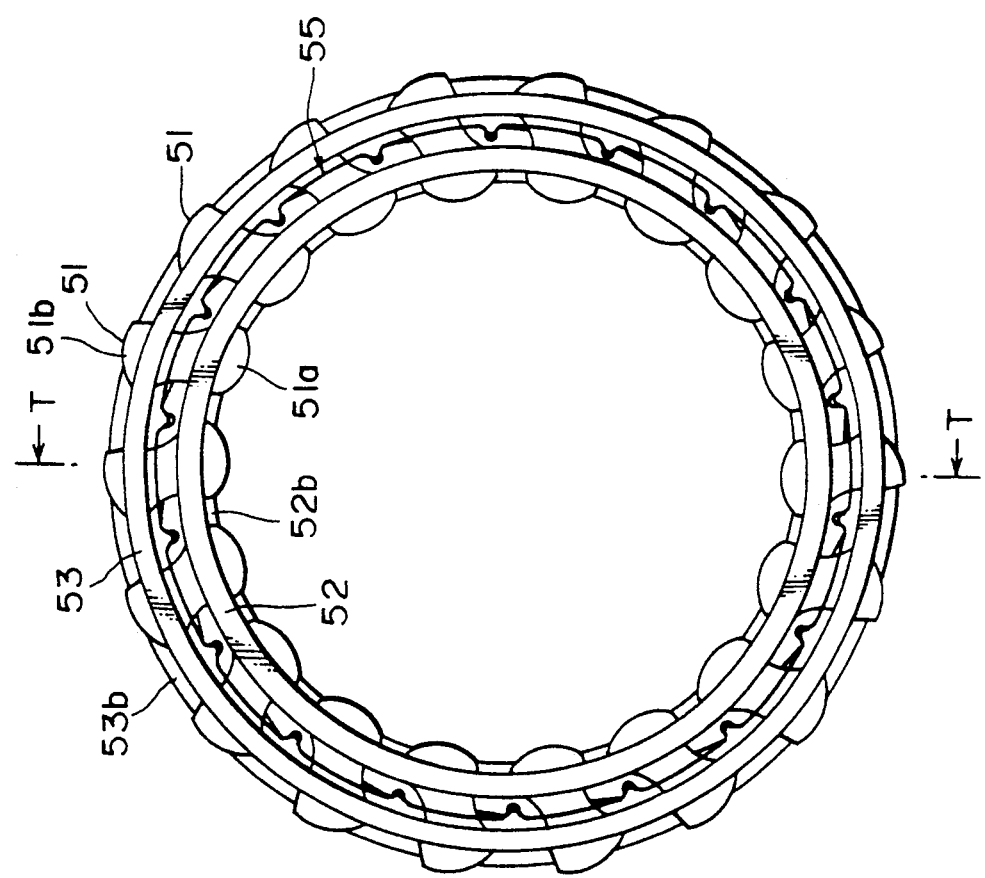

Furthermore, when contact portions 20 provided at both axial ends of the inner retainer 172 make frictional contact with the inner ring, as shown in FIGS. 6 (a) and 6 (b), or when the protrusions 21 on provided at the inner circumferences of the flange portions 2b, 2b at the same ends of the inner retainer 182 make frictional contact with the inner ring, as shown in FIGS. 7 (a) and 7 (b), the inner retainer 172 or 182 and the inner ring will make frictional contact with each other at both axial ends of the inner retainer 172 or 18. Therefore, the inner retainer 172 or 182 is made to follow the rotation of the inner ring more positively than when the contact portions 20 or the protrusions 21 are 82. Consequently, the torque transmission efficiency from the inner ring to the outer ring as well as the abrasion reduction effect with respect to the sprags 1 and the inner ring during the idling rotation can be remarkably enhanced.

Further, since the inner retainer 72 or 82 is made of a plastic, the contact portions 20 and the protrusions 21 and 22 can be easily formed integrally, unlike the prior art in which the inner retainer is made of a metal.

Furthermore, because the inner retainer 2, 62, 72, . . . , or 182 is made of a plastic, the margin over which the inner retainer 2, 62, 72, . . . , or 182 and the inner ring can be fastened allows for a wider tolerance.

As is obvious from the above description, the one-way clutch of the present invention, having each of the outer retainer and the inner retainer made of a plastic, can achieve sufficient reductions in weight and cost as compared with the prior art in which at least one of the outer retainer and the inner retainer is made of a metal.

Further, since the plastic used for making the inner retainer has a greater strength than that used for making the outer retainer, the inner portions of the sprags that serve as center portions about which the sprags swing can be retained by the inner retainer more securely than can the outer portions of the sprags by the outer retainer. Accordingly, a more positive, stable swinging motion of the sprags is realized. Consequently, the outer ring can be positively locked with and released from the inner ring, allowing a sufficient torque transmission ability to be obtained.

Also, when the inner retainer is made of a fiber-reinforced plastic, weight reduction of the inner retainer can be remarkably facilitated while its strength can be greatly enhanced.

Furthermore, when protrusions or contact portions that make frictional contact with the inner ring are provided at the inner circumference of the inner retainer, the inner retainer is made to follow the rotation of the inner ring, allowing the motion of the inner ring to be transmitted positively to the sprags via the inner retainer. Thus, the sprags are made to positively swing in the upright direction by the inner retainer that follows the rotation of the inner ring in the torque transmission direction, so that the inner ring and the outer ring are positively locked with each other, result in improved torque transmission efficiency from the inner ring to the outer ring. Also, since the sprags are made to positively swing in the tilting direction by the inner retainer that follows, the rotation of the inner ring in the direction of idling rotation, the outer ring will be positively released from the inner ring, so that the contact pressure between the sprags and the inner ring during the idling rotation of the inner ring is lowered, reducing the abrasion of the sprags and the inner ring.

Further, since the inner retainer is made of a plastic, the contact portion or the protrusion can be easily formed integrally, unlike the prior art in which the inner retainer is made of a metal.

Furthermore, because the inner retainer is made of a plastic, the margin over which the inner retainer and the inner ring can be fastened allows for a wider tolerance.

It will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A one-way clutch comprising: a plurality of sprags spaced at specified intervals in a circumferential direction of the one-way clutch; an annular inner retainer of fiber-reinforced plastic retaining radially inner portions of the sprags; an annular outer retainer of plastic retaining radially outer portions of the sprags; and a spring urging the sprags in one circumferential direction of the one-way clutch, the fiber-reinforced plastic of the inner retainer having a greater strength than the plastic of the outer retainer.

2. The one-way clutch as claimed in claim 1, wherein an inner circumferential surface of the inner retainer has a substantially polygonal shape in section constituted by at least one contact portion of the inner retainer that is to contact and be frictionally dragged by an inner ring.

3. The one-way clutch as claimed in claim 2, wherein the inner retainer has at least one said contact portion at each of axial ends thereof.

4. The one-way clutch as claimed in claim 1, wherein the inner retainer has a plurality of protrusions at an inner circumferential surface of the inner retainer and which protrusions are to contact and be frictionally dragged by an inner ring.

5. The one-way clutch as claimed in claim 4, wherein the inner retainer has a plurality of said protrusions at both axial ends thereof.

* * * * *